United States Patent
Duan et al.

(10) Patent No.: US 12,106,445 B2
(45) Date of Patent: *Oct. 1, 2024

(54) AUTOMATIC IMAGE INPAINTING

(71) Applicant: Snap Inc., Santa Monica, CA (US)

(72) Inventors: Kun Duan, Los Angeles, CA (US); Yunchao Gong, Playa Vista, CA (US); Nan Hu, San Jose, CA (US)

(73) Assignee: SNAP INC., Santa Monica, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/316,793

(22) Filed: May 12, 2023

(65) Prior Publication Data

US 2023/0368332 A1 Nov. 16, 2023

Related U.S. Application Data

(63) Continuation of application No. 17/400,436, filed on Aug. 12, 2021, now Pat. No. 11,682,105, which is a continuation of application No. 16/829,720, filed on Mar. 25, 2020, now Pat. No. 11,107,185, which is a continuation of application No. 16/387,110, filed on Apr. 17, 2019, now Pat. No. 10,636,119, which is a continuation of application No. 16/122,639, filed on
(Continued)

(51) Int. Cl.
| | |
|---|---|
| *G06T 3/40* | (2024.01) |
| *G06F 3/04842* | (2022.01) |
| *G06F 3/04845* | (2022.01) |
| *G06T 5/77* | (2024.01) |
| *G06T 11/60* | (2006.01) |

(52) U.S. Cl.
CPC .............. *G06T 3/40* (2013.01); *G06F 3/04842* (2013.01); *G06F 3/04845* (2013.01); *G06T 5/77* (2024.01); *G06T 11/60* (2013.01); *G06T 2200/24* (2013.01)

(58) Field of Classification Search
CPC ... G06T 3/40; G06T 5/77; G06T 11/00; G06T 2200/24; G06T 11/60; G06F 3/04842; G06F 3/04845
See application file for complete search history.

(56) References Cited

U.S. PATENT DOCUMENTS

| | | |
|---|---|---|
| 6,038,295 A | 3/2000 | Mattes |
| 6,980,909 B2 | 12/2005 | Root et al. |

(Continued)

FOREIGN PATENT DOCUMENTS

CA    2887596 A1    7/2015

OTHER PUBLICATIONS

"U.S. Appl. No. 15/448,216, Notice of Allowance mailed Jul. 11, 2018", 10 pgs.
(Continued)

*Primary Examiner* — Michelle Chin
(74) *Attorney, Agent, or Firm* — SCHWEGMAN LUNDBEG & WOESSNER, P.A.

(57) ABSTRACT

The technical problem of removing an object depicted in a selected region of an image to create a natural-looking edited image is addressed by providing systems, methods, and computer-readable storage media to perform automatic image inpainting. The method includes replacing the selected region using a color mask. A color mask can be generated using a mean color of pixels from a portion of the image that is distinct from and outside of the selected region.

20 Claims, 12 Drawing Sheets

Related U.S. Application Data

Sep. 5, 2018, now Pat. No. 10,304,162, which is a continuation of application No. 15/448,216, filed on Mar. 2, 2017, now Pat. No. 10,127,631.

(56) References Cited

U.S. PATENT DOCUMENTS

| | | |
|---|---|---|
| 7,173,651 B1 | 2/2007 | Knowles |
| 7,411,493 B2 | 8/2008 | Smith |
| 7,535,890 B2 | 5/2009 | Rojas |
| 8,131,597 B2 | 3/2012 | Hudetz |
| 8,199,747 B2 | 6/2012 | Rojas et al. |
| 8,332,475 B2 | 12/2012 | Rosen et al. |
| 8,718,333 B2 | 5/2014 | Wolf et al. |
| 8,724,622 B2 | 5/2014 | Rojas |
| 8,874,677 B2 | 10/2014 | Rosen et al. |
| 8,909,679 B2 | 12/2014 | Root et al. |
| 8,995,433 B2 | 3/2015 | Rojas |
| 9,040,574 B2 | 5/2015 | Wang et al. |
| 9,055,416 B2 | 6/2015 | Rosen et al. |
| 9,100,806 B2 | 8/2015 | Rosen et al. |
| 9,100,807 B2 | 8/2015 | Rosen et al. |
| 9,191,776 B2 | 11/2015 | Root et al. |
| 9,204,252 B2 | 12/2015 | Root |
| 9,443,227 B2 | 9/2016 | Evans et al. |
| 9,489,661 B2 | 11/2016 | Evans et al. |
| 9,491,134 B2 | 11/2016 | Rosen et al. |
| 9,606,364 B2 | 3/2017 | Burns |
| 10,127,631 B1 | 11/2018 | Duan et al. |
| 10,304,162 B1 | 5/2019 | Duan et al. |
| 10,636,119 B1 | 4/2020 | Duan et al. |
| 11,107,185 B2 | 8/2021 | Duan et al. |
| 11,682,105 B2 | 6/2023 | Duan et al. |
| 2002/0041705 A1 | 4/2002 | Lin et al. |
| 2007/0019854 A1 | 1/2007 | Gholap et al. |
| 2007/0025637 A1 | 2/2007 | Setlur et al. |
| 2009/0034868 A1* | 2/2009 | Rempel ............... G09G 3/3426 382/274 |
| 2011/0202598 A1 | 8/2011 | Evans et al. |
| 2012/0209924 A1 | 8/2012 | Evans et al. |
| 2013/0121577 A1* | 5/2013 | Wang ............... G06V 10/764 382/173 |
| 2014/0118577 A1 | 5/2014 | Masuda |
| 2014/0126833 A1 | 5/2014 | Huang et al. |
| 2015/0206318 A1 | 7/2015 | Parfenov et al. |
| 2016/0012574 A1 | 1/2016 | Li et al. |
| 2016/0148362 A1 | 5/2016 | Bedi et al. |
| 2016/0162767 A1 | 6/2016 | Ito et al. |
| 2017/0148199 A1 | 5/2017 | Holzer et al. |
| 2017/0272660 A1 | 9/2017 | Shihara et al. |
| 2018/0098690 A1 | 4/2018 | Waki |
| 2020/0226714 A1 | 7/2020 | Duan et al. |
| 2021/0374905 A1 | 12/2021 | Duan et al. |

OTHER PUBLICATIONS

"U.S. Appl. No. 16/122,639, Non Final Office Action mailed Oct. 25, 2018", 10 pgs.

"U.S. Appl. No. 16/122,639, Notice of Allowance mailed Jan. 30, 2019", 7 pgs.

"U.S. Appl. No. 16/122,639, Response filed Jan. 4, 2019 to Non Final Office Action mailed Oct. 25, 2018", 9 pgs.

"U.S. Appl. No. 16/387,110, Final Office Action mailed Aug. 21, 2019", 13 pgs.

"U.S. Appl. No. 16/387,110, Non Final Office Action mailed May 13, 2019", 12 pgs.

"U.S. Appl. No. 16/387,110, Notice of Allowance mailed Dec. 18, 2019", 7 pgs.

"U.S. Appl. No. 16/387,110, Response filed Dec. 9, 2019 to Final Office Action mailed Aug. 21, 2019", 8 pgs.

"U.S. Appl. No. 16/387,110, Response filed Aug. 12, 2019 to Non-Final Office Action mailed May 13, 2019", 8 pgs.

"U.S. Appl. No. 16/829,720, Examiner Interview Summary mailed Dec. 3, 2020", 3 pgs.

"U.S. Appl. No. 16/829,720, Final Office Action mailed Sep. 25, 2020", 30 pgs.

"U.S. Appl. No. 16/829,720, Non Final Office Action mailed Apr. 16, 2020", 24 pgs.

"U.S. Appl. No. 16/829,720, Non Final Office Action mailed Dec. 24, 2020", 32 pgs.

"U.S. Appl. No. 16/829,720, Notice of Allowance mailed May 5, 2021", 10 pgs.

"U.S. Appl. No. 16/829,720, Response filed Feb. 8, 2021 to Non Final Office Action mailed Dec. 24, 2020", 10 pgs.

"U.S. Appl. No. 16/829,720, Response filed Jul. 15, 2020 to Non Final Office Action mailed Apr. 16, 2020", 11 pgs.

"U.S. Appl. No. 16/829,720, Response filed Dec. 8, 2020 to Final Office Action mailed Sep. 25, 2020", 10 pgs.

"U.S. Appl. No. 17/400,436, Non Final Office Action mailed Oct. 5, 2022", 20 pgs.

"U.S. Appl. No. 17/400,436, Notice of Allowance mailed Feb. 7, 2023", 10 pgs.

"U.S. Appl. No. 17/400,436, Response Filed Jan. 5, 2023 to Non Final Office Action Mailed Oct. 5, 2022", 10pgs.

He, Kaiming, et al., "Statistics of Patch Offsets for Image Completion", Computer Vision—ECCV 2012, (2012), 14 pgs.

Leyden, John, "This SMS will self-destruct in 40 seconds", [Online] Retrieved from the Internet: <URL: http://www.theregister.co.uk/2005/12/12/stealthtext/>, (Dec. 12, 2005), 1 pg.

Pritch, Yael, et al., "Shift-Map Image Editing", 2009 IEEE 12th International Conference on Computer Vision (ICCV), (2009), 151-158.

* cited by examiner

AUTOMATIC IMAGE INPAINTING

This application is a continuation of and claims the benefit of priority of U.S. patent application Ser. No. 17/400,436, filed on Aug. 12, 2021, which is a continuation of and claims the benefit of priority of U.S. patent application Ser. No. 16/829,720, filed on Mar. 25, 2020, which is a continuation of and claims the benefit of priority of U.S. patent application Ser. No. 16/387,110, filed on Apr. 17, 2019, which is a continuation of and claims the benefit of priority of U.S. patent application Ser. No. 16/122,639, filed on Sep. 5, 2018, which is a continuation of and claims the benefit of priority of U.S. patent application Ser. No. 15/448,216, filed on Mar. 2, 2017, each of which is hereby incorporated by reference herein in their entireties.

TECHNICAL FIELD

The present disclosure generally relates to the technical field of special-purpose machines for performing image inpainting, including computerized variants of such special-purpose machines and improvements to such variants, and to the technologies by which such special-purpose machines become improved compared to other special-purpose machines that perform image inpainting. In particular, the present disclosure addresses systems and methods for automatic image inpainting using local patch statistics.

BACKGROUND

As the popularity of social networking grows, the number of digital images generated and shared using social networks grows as well. Prior to sharing such digital images on social networks, users may wish to remove certain objects depicted in the images or other undesirable elements of the images. Among other things, embodiments of the present disclosure help users perform edits to digital images, such as removing certain regions of an image and filling these regions with other portions of the image to create a natural-looking edited image.

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings.

DETAILED DESCRIPTION

Figure 1:
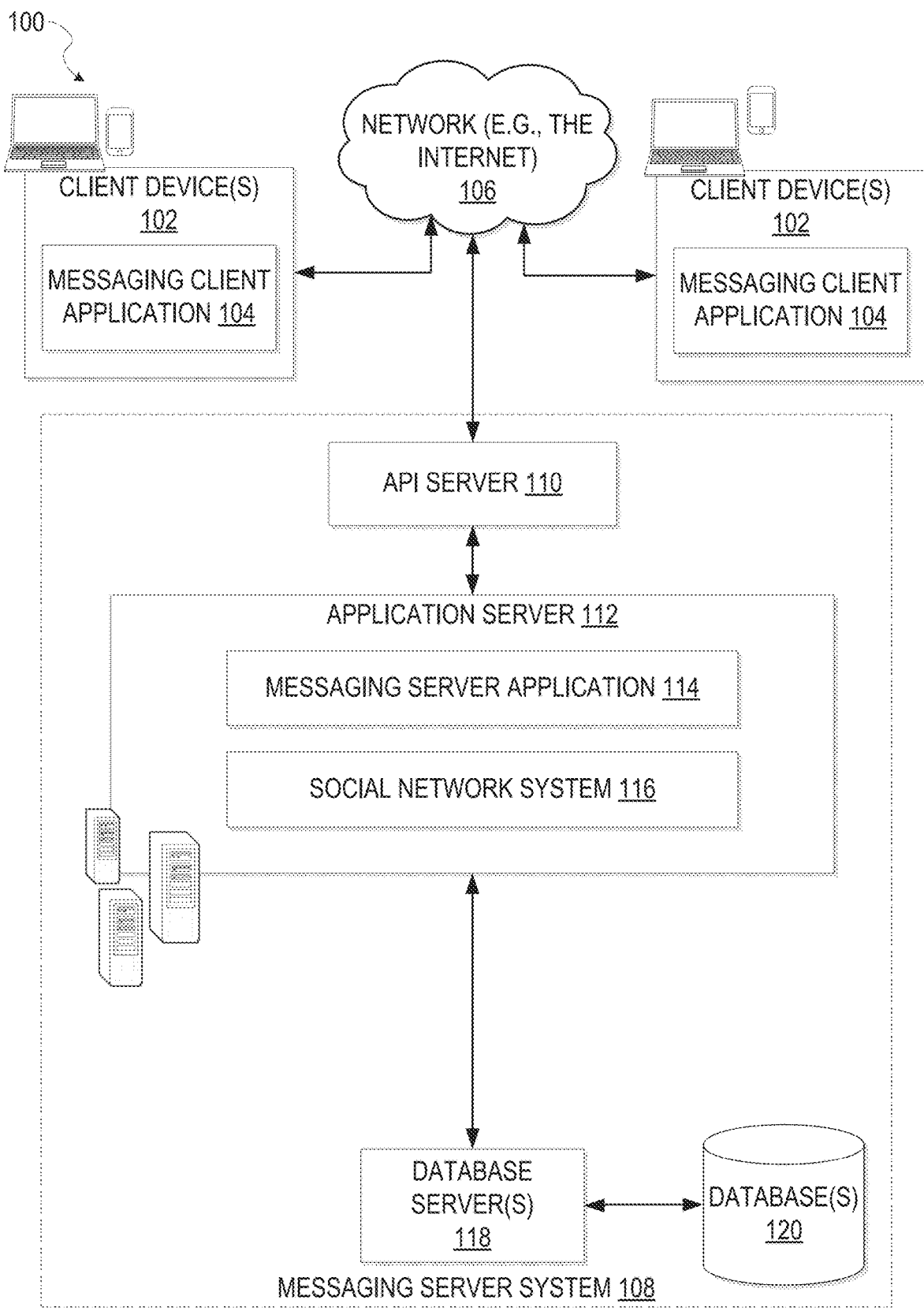
FIG. 1 is a block diagram showing an example messaging system for exchanging data (e.g., messages and associated content) over a network, according to some embodiments.

The description that follows includes systems, methods, techniques, instruction sequences, and computing machine program products that embody illustrative embodiments of the disclosure. In the following description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques are not necessarily shown in detail.

Aspects of the present disclosure include systems, methods, techniques, instruction sequences, and computing machine program products that allow a user to select an object, region, or other element in an original image to be removed and replaced using other portions (e.g. background) of the image, thereby making the resulting edited image appear more natural. As an example, a user may take a picture of two people, and select one of the two people for removal from the picture. Upon receiving an indication of the selection of person to be removed, the system removes the selected person from the image and inpaints (e.g., fills) the missing region (e.g., the region with the person removed) using portions of the picture near the missing region. The result of this process is an edited picture of a single person that appears natural despite omitting the second person that was in the original image.

Consistent with some embodiments, the system determines a local region for a user-selected region that includes the object or other element the user seeks to remove. The systems selects the portions of the image to inpaint (e.g., fill) the user-selected region from the local region. More specifically, the system identifies patch matches within the local region (e.g., two identical image patches that each comprise one or more pixels) and uses a portion of the identified patch matches to inpaint the user-selected region.

As part of this process, the system computes local patch match statistics that comprise patch offsets for the identified patch matches. The patch offsets include a distance (e.g., represented in two spatial dimensions) between patch matches. The system uses the patch match statistics to build a spatial histogram. To fill the user selected region, a pixel-level graph cut algorithm may be applied, where the label of each pixel in the user-selected region corresponds to a possible (x, y) offset in the histogram. By computing patch match statistics only in the local region rather than the entire image, the system achieves a faster runtime speed compared to other methods that use patch match statistics from the entire image. Additionally, by limiting the computation of patch matches to the local region, the system employs improved techniques for image inpainting that overcome difficulties encountered by conventional methodologies in processing complex backgrounds or cluttered scenes.

To incorporate sufficient patch match statistics when the user-selected region is close to the image border, the system may pad the original image by a predefined padding size (e.g., by appending a reflection of the outer portion of the image to the image border), and enlarge the local region by the predefined padding size to allow sufficient patch match statistics to be calculated. The system may further scale (e.g., resize) the user-selected region to a predetermined size (e.g., 100×75 pixels) before filling the region with the portion of the identified patch matches.

Additionally, in some instances, the techniques used to fill the user-selected region with portions of the patch matches may create strong edges (e.g., pronounced image brightness discontinuities) in the inpainted image. To compensate for this, the system applies edge-preserving filtering techniques to blur insignificant edges. The system may then identify the strong edges from the filtered image to generate an edge map. The system may further dilate the edge map to generate a binary mask for possible strong edge pixels. The system also applies blurring techniques (e.g., Gaussian blur) on the inpainting result to generate a blurred version of the inpainted image. The system may then blend together the original inpainted image with the blurred version by applying blending techniques (e.g., Laplacian blending) with the binary mask. In this way, the system may produce high-quality natural-looking inpainted images while being optimized for runtime speed (especially on mobile configurations).

FIG. 1 is a block diagram showing an example messaging system 100 for exchanging data (e.g., messages and associated content) over a network. The messaging system 100 includes multiple client devices 102, each of which hosts a number of applications including a messaging client application 104. Each messaging client application 104 is communicatively coupled to other instances of the messaging client application 104 and a messaging server system 108 via a network 106 (e.g., the Internet). As used herein, the term "client device" may refer to any machine that interfaces with a communications network (such as the network 106) to obtain resources from one or more server systems or other client devices. A client device may be, but is not limited to, a mobile phone, desktop computer, laptop, portable digital assistant (PDA), smart phone, tablet, ultra book, netbook, laptop, multi-processor system, microprocessor-based or programmable consumer electronics system, game console, set-top box, or any other communication device that a user may use to access a network.

In the example shown in FIG. 1, each messaging client application 104 is able to communicate and exchange data with another messaging client application 104 and with the messaging server system 108 via the network 106. The data exchanged between the messaging client applications 104, and between a messaging client application 104 and the messaging server system 108, includes functions (e.g., commands to invoke functions) as well as payload data (e.g., text, audio, video, or other multimedia data).

The network 106 may include, or operate in conjunction with, an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, the network 106 or a portion of the network 106 may include a wireless or cellular network and the connection to the network 106 may be a Code Division Multiple Access (CDMA) connection, a Global System for Mobile communications (GSM) connection, or another type of cellular or wireless coupling. In this example, the coupling may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third-Generation Partnership Project (3GPP) including 3G, fourth-generation wireless (4G) networks, Universal Mobile Telecommunications System (UMTS), High-Speed Packet Access (HSPA), Worldwide Interoperability for Microwave Access (WiMAX), Long-Term Evolution (LTE) standard, or others defined by various standard-setting organizations, other long-range protocols, or other data transfer technology.

The messaging server system 108 provides server-side functionality via the network 106 to a particular messaging client application 104. While certain functions of the messaging system 100 are described herein as being performed by either a messaging client application 104 or by the messaging server system 108, it will be appreciated that the location of certain functionality either within the messaging client application 104 or the messaging server system 108 is a design choice. For example, it may be technically preferable to initially deploy certain technology and functionality within the messaging server system 108, but to later migrate this technology and functionality to the messaging client application 104 where a client device 102 has a sufficient processing capacity.

The messaging server system 108 supports various services and operations that are provided to the messaging client application 104. Such operations include transmitting data to, receiving data from, and processing data generated by the messaging client application 104. This data may include message content, client device information, geolocation information, media annotation and overlays, message content persistence conditions, social network information, and live event information, as examples. Data exchanges within the messaging system 100 are invoked and controlled through functions available via user interfaces (UIs) of the messaging client application 104.

Turning now specifically to the messaging server system 108, an Application Programming Interface (API) server 110 is coupled to, and provides a programmatic interface to, an application server 112. The application server 112 is communicatively coupled to a database server 118, which facilitates access to a database 120 in which is stored data associated with messages processed by the application server 112.

The API server 110 receives and transmits message data (e.g., commands and message payloads) between the client device 102 and the application server 112. Specifically, the API server 110 provides a set of interfaces (e.g., routines and protocols) that can be called or queried by the messaging client application 104 in order to invoke functionality of the application server 112. The API server 110 exposes various functions supported by the application server 112, including account registration; login functionality; the sending of messages, via the application server 112, from a particular messaging client application 104 to another messaging client application 104; the sending of media files (e.g., images or video) from a messaging client application 104 to the application server 112, for possible access by another messaging client application 104; the setting of a collection of media data (e.g., story); the retrieval of a list of friends of a user of a client device 102; the retrieval of such collections;

the retrieval of messages and content; the adding and deletion of friends to and from a social graph; the location of friends within a social graph; and the detecting of an application event (e.g., relating to the messaging client application 104).

The application server 112 hosts a number of applications and subsystems, including a messaging server application 114 and a social network system 116. The messaging server application 114 implements a number of message processing technologies and functions, particularly related to the aggregation and other processing of content (e.g., textual and multimedia content) included in messages received from multiple instances of the messaging client application 104. As will be described in further detail, the text and media content from multiple sources may be aggregated into collections of content (e.g., called stories or galleries). These collections are then made available, by the messaging server application 114, to the messaging client application 104. Other processor- and memory-intensive processing of data may also be performed server-side by the messaging server application 114, in view of the hardware requirements for such processing.

The social network system 116 supports various social networking functions and services, and makes these functions and services available to the messaging server application 114. To this end, the social network system 116 maintains and accesses an entity graph within the database 120. Examples of functions and services supported by the social network system 116 include the identification of other users of the messaging system 100 with whom a particular user has relationships or whom the user is "following," and also the identification of other entities and interests of a particular user.

Figure 2:
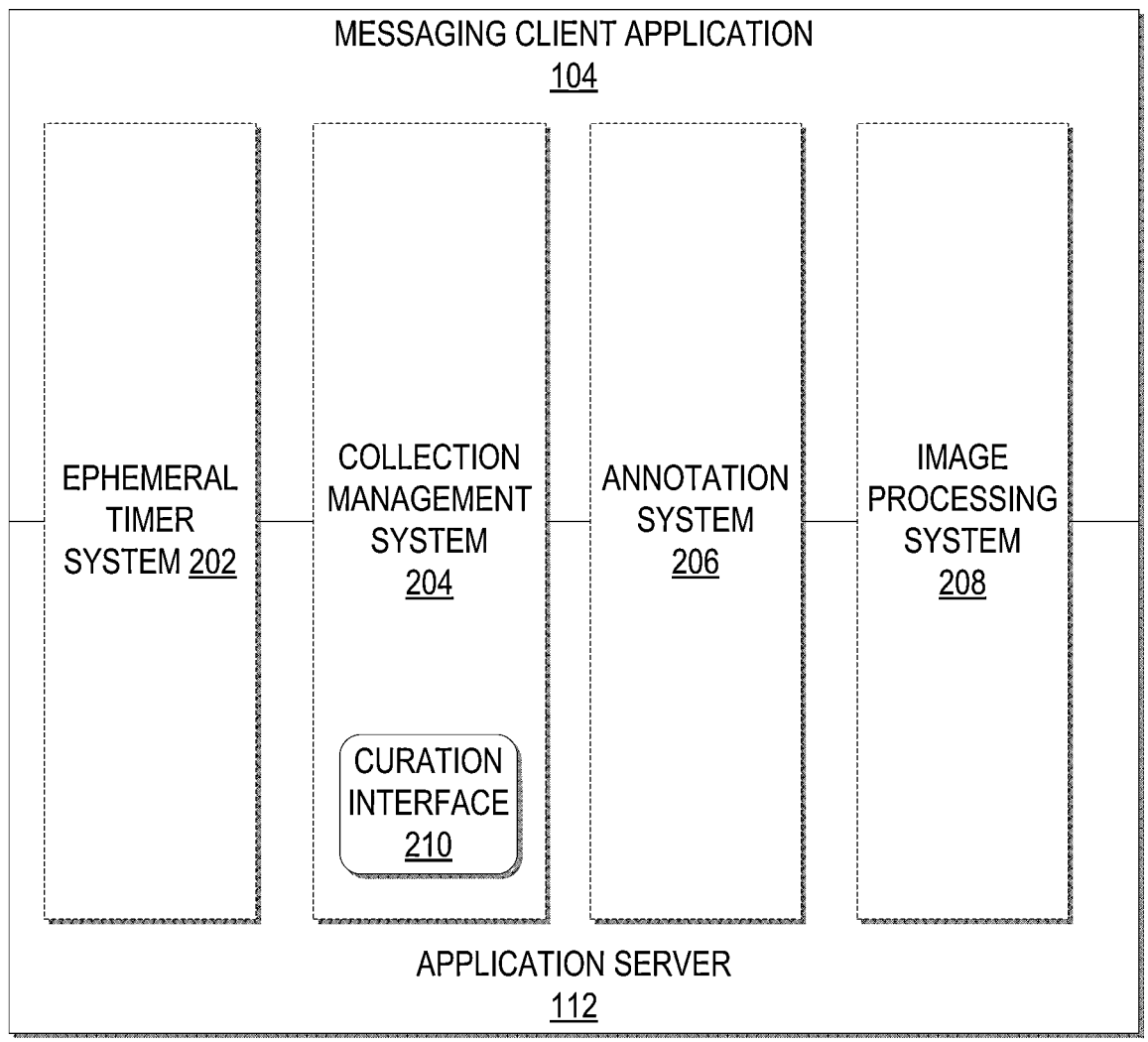
FIG. 2 is block diagram illustrating further details regarding the messaging system, according to some embodiments.

FIG. 2 is block diagram illustrating further details regarding the messaging system 100, according to exemplary embodiments. Specifically, the messaging system 100 is shown to comprise the messaging client application 104 and the application server 112, which in turn embody a number of subsystems, namely an ephemeral timer system 202, a collection management system 204, an annotation system 206, and an image processing system 208.

The ephemeral timer system 202 is responsible for enforcing the temporary access to content permitted by the messaging client application 104 and the messaging server application 114. To this end, the ephemeral timer system 202 incorporates a number of timers that, based on duration and display parameters associated with a message, or collection of messages (e.g., a SNAPCHAT story), selectively display and enable access to messages and associated content via the messaging client application 104. Further details regarding the operation of the ephemeral timer system 202 are provided below.

The collection management system 204 is responsible for managing collections of media (e.g., collections of text, image, video, and audio data). In some examples, a collection of content (e.g., messages, including images, video, text, and audio) may be organized into an "event gallery" or an "event story." Such a collection may be made available for a specified time period, such as the duration of an event to which the content relates. For example, content relating to a music concert may be made available as a "story" for the duration of that music concert. The collection management system 204 may also be responsible for publishing an icon that provides notification of the existence of a particular collection to the user interface of the messaging client application 104.

The collection management system 204 furthermore includes a curation interface 210 that allows a collection manager to manage and curate a particular collection of content. For example, the curation interface 210 enables an event organizer to curate a collection of content relating to a specific event (e.g., delete inappropriate content or redundant messages). Additionally, the collection management system 204 employs machine vision (or image recognition technology) and content rules to automatically curate a content collection. In certain embodiments, compensation may be paid to a user for inclusion of user-generated content in a collection. In such cases, the curation interface 210 operates to automatically make payments to such users for the use of their content.

The annotation system 206 provides various functions that enable a user to annotate or otherwise modify or edit media content associated with a message. For example, the annotation system 206 provides functions related to the generation and publishing of media overlays for messages processed by the messaging system 100. For example, the annotation system 206 operatively supplies a media overlay (e.g., a SNAPCHAT filter) to the messaging client application 104 based on a geolocation of the client device 102. In another example, the annotation system 206 operatively supplies a media overlay to the messaging client application 104 based on other information, such as social network information of the user of the client device 102. A media overlay may include audio and visual content and visual effects. Examples of audio and visual content include pictures, texts, logos, animations, and sound effects. An example of a visual effect includes color overlaying. The audio and visual content or the visual effects can be applied to a media content item (e.g., a photo) at the client device 102. For example, the media overlay may include text that can be overlaid on top of a photograph generated by the client device 102. In another example, the media overlay includes an identification of a location (e.g., Venice Beach), a name of a live event, or a name of a merchant (e.g., Beach Coffee House). In another example, the annotation system 206 uses the geolocation of the client device 102 to identify a media overlay that includes the name of a merchant at the geolocation of the client device 102. The media overlay may include other indicia associated with the merchant. The media overlays may be stored in the database 120 and accessed through the database server 118.

In one exemplary embodiment, the annotation system 206 provides a user-based publication platform that enables users to select a geolocation on a map, and upload content associated with the selected geolocation. The user may also specify circumstances under which a particular media overlay should be offered to other users. The annotation system 206 generates a media overlay that includes the uploaded content and associates the uploaded content with the selected geolocation.

In another exemplary embodiment, the annotation system 206 provides a merchant-based publication platform that enables merchants to select a particular media overlay associated with a geolocation via a bidding process. For example, the annotation system 206 associates the media overlay of a highest-bidding merchant with a corresponding geolocation for a predefined amount of time.

The image processing system 208 is dedicated to performing various image processing operations, in some instances, with respect to images or video received within the payload of a message at the messaging server application 114. As an example, the image processing system 208 provides functionality to allow a user to select an object or other element in an original image to be removed and replaced using other portions of the image. Further details regarding the image processing system 208 are discussed below in reference to FIG. 4, according to some embodiments.

Figure 3:
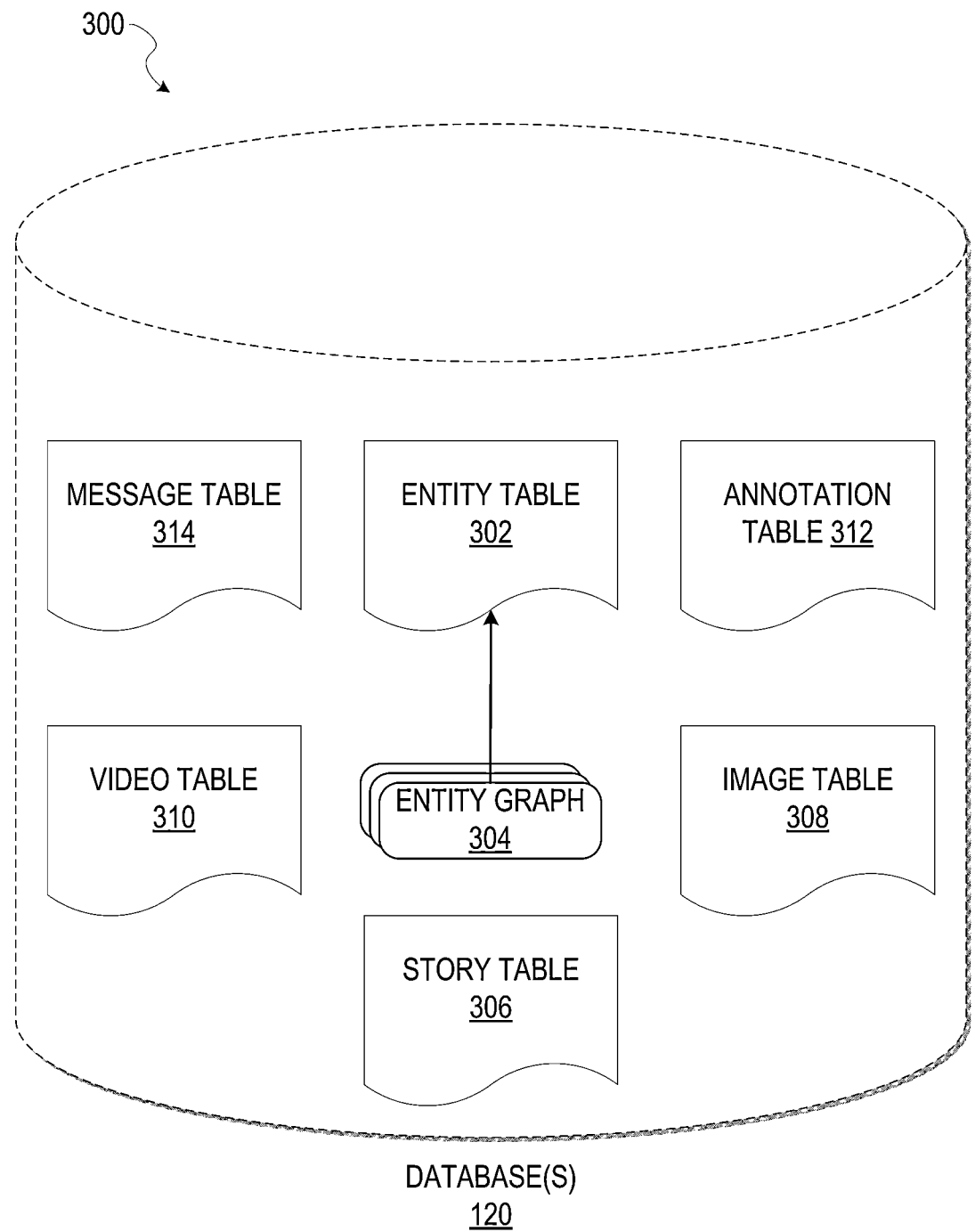
FIG. 3 is a schematic diagram illustrating data which may be stored in a database of the messaging system, according to some embodiments.

FIG. 3 is a schematic diagram 300 illustrating data which may be stored in the database 120 of the messaging server system 108, according to certain exemplary embodiments. While the content of the database 120 is shown to comprise a number of tables, it will be appreciated that the data could be stored in other types of data structures (e.g., as an object-oriented database).

The database 120 includes message data stored within a message table 314. An entity table 302 stores entity data, including an entity graph 304. Entities for which records are maintained within the entity table 302 may include individuals, corporate entities, organizations, objects, places, events, etc. Regardless of type, any entity regarding which the messaging server system 108 stores data may be a recognized entity. Each entity is provided with a unique identifier, as well as an entity type identifier (not shown).

The entity graph 304 furthermore stores information regarding relationships and associations between or among entities. Such relationships may be social, professional (e.g., work at a common corporation or organization), interested-based, or activity-based, merely for example.

The database 120 also stores annotation data, in the example form of filters, in an annotation table 312. Filters for which data is stored within the annotation table 312 are associated with and applied to videos (for which data is stored in a video table 310) and/or images (for which data is stored in an image table 308). Filters, in one example, are overlays that are displayed as overlaid on an image or video during presentation to a recipient user. Filters may be of varies types, including user-selected filters from a gallery of filters presented to a sending user by the messaging client application 104 when the sending user is composing a message. Other types of filters include geolocation filters (also known as geo-filters), which may be presented to a sending user based on geographic location. For example, geolocation filters specific to a neighborhood or special location may be presented within a user interface by the messaging client application 104, based on geolocation information determined by a Global Positioning System (GPS) unit of the client device 102. Another type of filter is a data filter, which may be selectively presented to a sending user by the messaging client application 104, based on other inputs or information gathered by the client device 102 during the message creation process. Examples of data filters include a current temperature at a specific location, a current speed at which a sending user is traveling, a battery life for a client device 102, or the current time.

Other annotation data that may be stored within the image table 308 is so-called "lens" data. A "lens" may be a real-time special effect and sound that may be added to an image or a video.

As mentioned above, the video table 310 stores video data which, in one embodiment, is associated with messages for which records are maintained within the message table 314. Similarly, the image table 308 stores image data associated with messages for which message data is stored in the entity table 302. The entity table 302 may associate various annotations from the annotation table 312 with various images and videos stored in the image table 308 and the video table 310.

A story table 306 stores data regarding collections of messages and associated image, video, or audio data, which are compiled into a collection (e.g., a SNAPCHAT story or a gallery). The creation of a particular collection may be initiated by a particular user (e.g., a user for whom a record is maintained in the entity table 302). A user may create a "personal story" in the form of a collection of content that has been created and sent/broadcast by that user. To this end, the user interface of the messaging client application 104 may include an icon that is user-selectable to enable a sending user to add specific content to his or her personal story.

A collection may also constitute a "live story," which is a collection of content from multiple users that is created manually, automatically, or using a combination of manual and automatic techniques. For example, a "live story" may constitute a curated stream of user-submitted content from various locations and events. Users whose client devices have location services enabled and who are at a common location or event at a particular time may, for example, be presented with an option, via a user interface of the messaging client application 104, to contribute content to a particular live story. The live story may be identified to the user by the messaging client application 104, based on his or her location. The end result is a "live story" told from a community perspective.

A further type of content collection is known as a "location story," which enables a user whose client device 102 is located within a specific geographic location (e.g., on a college or university campus) to contribute to a particular collection. In some embodiments, a contribution to a location story may require a second degree of authentication to verify that the end user belongs to a specific organization or other entity (e.g., is a student on the university campus).

Figure 4:
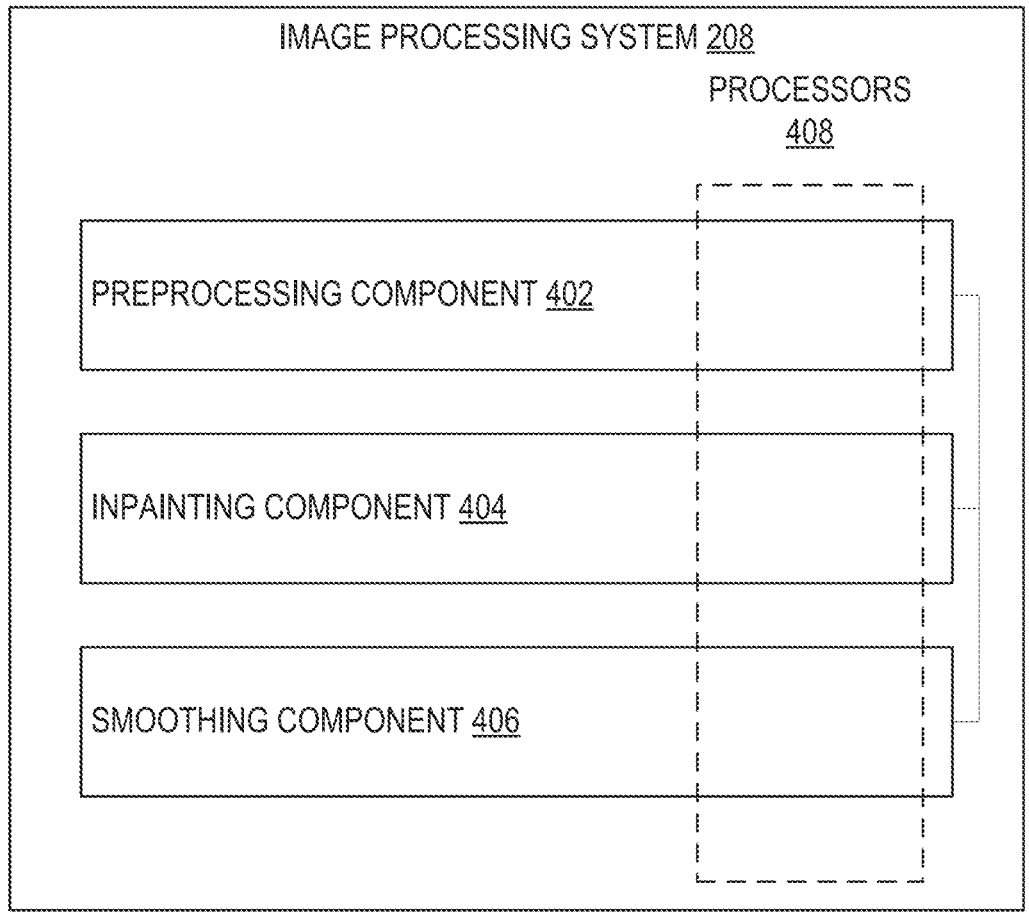
FIG. 4 is a block diagram illustrating functional components of an image processing system that forms part of the messaging system, according to some example embodiments.
Figure 5:
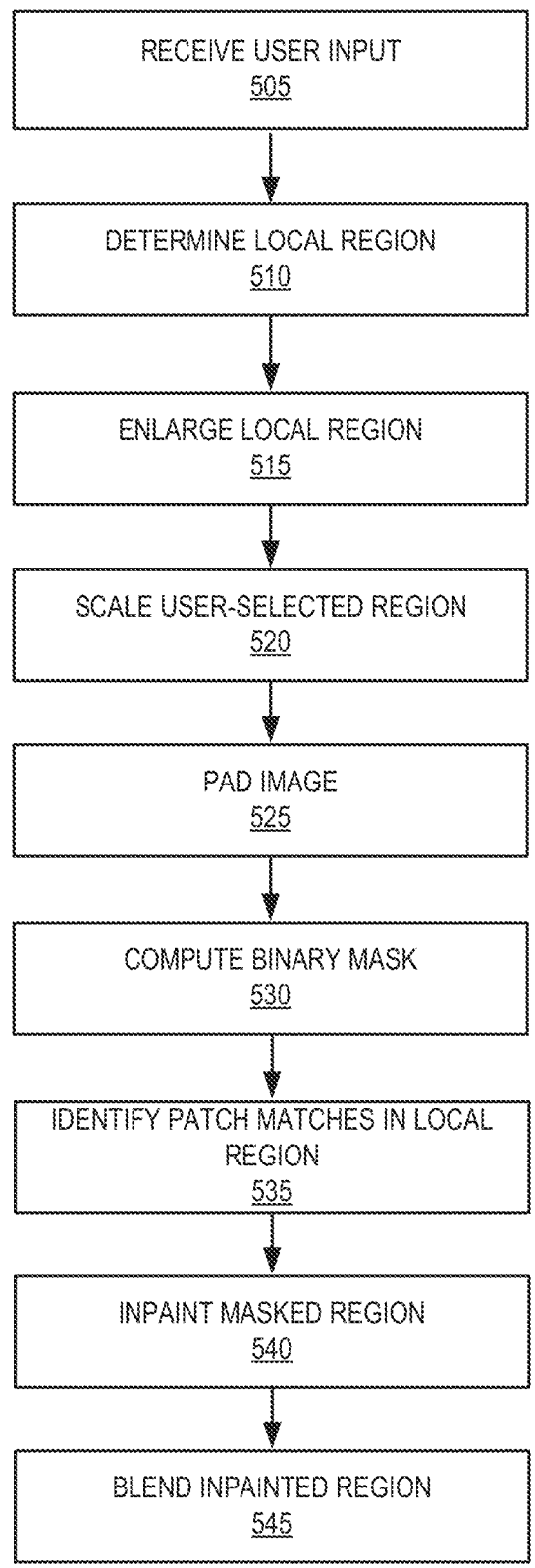
FIGS. 5-8 are flow charts illustrating operations of the image processing system in performing an example method for digital image editing, according to some embodiments.

FIG. 4 is a block diagram illustrating functional components of the image processing system 208 that forms part of the messaging system 100, according to some example embodiments. To avoid obscuring the inventive subject matter with unnecessary detail, various functional components (e.g., modules, engines, and databases) that are not germane to conveying an understanding of the inventive subject matter have been omitted from FIG. 4. However, a skilled artisan will readily recognize that various additional functional components may be supported by the image processing system 208 to facilitate additional functionality that is not specifically described herein. As shown, the image processing system 208 includes a preprocessing component 402, an inpainting component 404, and a smoothing component 406. The above referenced functional components of the image processing system 208 are configured to communicate with each other (e.g., via a bus, shared memory, a switch, or APIs). Collectively, these components facilitate inpainting of a user-selected region of an image using local patch matches in the image. In other words, the preprocessing component 402, inpainting component 404, and smoothing component 406 work in conjunction to allow a user to select an object or other element in an original image to be removed and replaced using other portions of the image, thereby making the resulting modified image without the object or other element appear natural.

The preprocessing component 402 is responsible for performing various transformations to images prior to inpainting to improve (e.g., optimize) runtime speed of the inpainting. To this end, the preprocessing component 402 is configured to determine a local region in an image that serves as a boundary to limit the computations involved in the inpainting process to a neighboring region surrounding the user-selected region of the image. A size of the local region is dynamically computed based on a size of the user-selected region. The preprocessing component 402 is further configured to pad the height and width dimensions of the image by a predetermined padding size to incorporate enough background to calculate patch match statistics when the user-selected region is close to the image border. Additionally, the preprocessing component 402 may further enlarge the local region by the predetermined padding size, and scale (e.g., resize) the user-selected region to a predetermined size (e.g., 100×75 pixels) as part of the runtime speed optimization.

The inpainting component 404 is configured to inpaint the user-selected region using local patch match statistics. As part of this process, the inpainting component 404 identifies patch matches (e.g., identical groupings of pixels) in the local region and obtains the offsets of the patch matches (e.g., a distance between patch matches defined by two-dimensional coordinates). The inpainting component 404 inpaints the user-selected region using at least a portion of the patch matches from the local region. More specifically, the inpainting component 404 fills the user-selected region by combining a stack of shift images based on patch offset statistics computed for the patch matches in the local region. The inpainting of the user-selected region in the original image results in a modified image that appears natural despite omitting what was previously shown in the user-selected region.

The smoothing component 406 is configured to blend the inpainted region into the image and smooth any strong edges (e.g., pronounced image brightness discontinuities) resulting from the inpainting process. For conventional methodologies, the final image blending step can be a speed bottleneck, especially in mobile configurations and/or when the user-selected region is large. To improve upon conventional methodologies, the smoothing component 406 may apply fast and lightweight blending techniques such as Laplacian blending to the inpainted region to optimize runtime speed. Additionally, as noted above, the inpainting process may, in some instances, introduce strong edges into the resulting modified image. To smooth these strong edges, the smoothing component 406 applies edge-preserving filtering to the initial inpainting result (e.g., the modified image produced by the inpainting component 404) to blur insignificant edges, and the smoothing component 406 then identifies strong edges in the resulting filtered grayscale image to produce an edge map. The smoothing component 406 may further dilate the resulting edge map to generate a binary mask for possible strong edge pixels. The smoothing component 406 also applies blurring techniques (e.g., Gaussian blur) on the inpainting result to generate a blurred version of the image, which is blended together with the initial inpainting result by applying blending techniques (e.g., Laplacian blending) with the binary mask mentioned above.

As is understood by skilled artisans in the relevant computer and Internet-related arts, each functional component illustrated in FIG. 4 may be implemented using hardware (e.g., a processor of a machine) or a combination of logic (e.g., executable software instructions) and hardware (e.g., memory and the processor of a machine) for executing the logic. For example, any component included as part of the image processing system 208 may physically include an arrangement of one or more processors 408 (e.g., a subset of or among one or more processors of a machine) configured to perform the operations described herein for that component. As another example, any component of the image processing system 208 may include software, hardware, or both, that configure an arrangement of the one or more processors 408 to perform the operations described herein for that component. Accordingly, different components of the image processing system 208 may include and configure different arrangements of such processors 408 or a single arrangement of such processors 408 at different points in time.

Furthermore, the various functional components depicted in FIG. 4 may reside on a single machine (e.g., a client device or a server) or may be distributed across several machines in various arrangements such as cloud-based architectures. Moreover, any two or more of these components may be combined into a single component, and the functions described herein for a single component may be subdivided among multiple components. Functional details of these components are described below with respect to FIGS. 5-8.

FIGS. 5-8 are flow charts illustrating operations of the image processing system 208 in performing an example method 500 for digital image editing, according to some embodiments. The method 500 may be embodied in computer-readable instructions for execution by one or more processors such that the operations of the method 500 may be performed in part or in whole by the functional components of the image processing system 208; accordingly, the method 500 is described below by way of example with reference thereto. However, it shall be appreciated that at least some of the operations of the method 500 may be deployed on various other hardware configurations and the method 500 is not intended to be limited to the image processing system 208.

In the context of method 500, the image processing system 208 accesses an image stored on the client device 102 or at the messaging server system 108. The image may be displayed within or as part of a user interface provided by the messaging client application 104 for presentation on the client device 102, and in some instances, the image may be captured by the client device 102.

At operation 505, the image processing system 208 receives a user input identifying a user-selected region of the image. The user may provide the user input identifying the selected region of the image by tracing a border of the region on the image by way of appropriate interaction with an input device of the client device 102 (e.g., using a finger to trace the border on a touch screen of the client device 102). Accordingly, the user-selected region of the image is not limited to any particular shape or size. For purposes of clarity in describing the method 500, the image on which the user selects the region may be referred to as the "original image."

At operation 510, the preprocessing component 402 determines a local region for the user-selected region of the original image based on a size of the user-selected region. The local region includes a portion of the original image outside of the user-selected region and that surrounds the user-selected region. The determining of the local region includes dynamically computing a size (e.g., height and width) of the local region based on a size of the user-selected region. For example, if the height of the user-selected region is h and the width of the user-selected region is w, the preprocessing component 402 may compute the height of the local region to be 2h and the width to be 2w.

At operation 515, the preprocessing component 402 enlarges the local region of the original image by a pre-defined padding size. For example, the preprocessing component 402 may enlarge the height, h, of the local region by h/2, and the width, w, by w/2.

At operation 520, the preprocessing component 402 scales (e.g., resizes) the user-selected region of the original image to a predetermined size. For example, the preprocessing component 402 may down scale the user-selected region by resizing it to a predetermined size of 100 pixels×75 pixels. The scaling of the user-selected region yields a scaled user-selected region.

At operation 525, the preprocessing component 402 pads the original image by the predefined padding size. In padding the original image, the preprocessing component 402 copies an outer boundary of the original image, and appends the copied outer boundary to the original image border such that the appended copy of the outer boundary creates a mirrored reflection of the actual outer boundary. As an example, the preprocessing component 402 may pad the height, h, of the original image by h/2, and the width, w, by w/2.

At operation 530, the inpainting component 404 computes a binary mask for the scaled user-selected region. In computing the binary mask, the inpainting component 404 marks pixels inside the scaled user-selected region as "1," and marks pixels in the remainder of the image as "0."

At operation 535, the inpainting component 404 identifies patch matches within the enlarged local region. Each patch match comprises two identical image patches, and each image patch comprises one or more pixels of the original image. By limiting the search for patch matches to the enlarged local region rather than the entire image, the inpainting component 404 may achieve a faster runtime speed.

To identify patch matches within the enlarged local region of the original image, the inpainting component 404 may apply a PatchMatch algorithm to the enlarged local region. The PatchMatch algorithm finds the patch matches by defining a nearest-neighbor field (NNF) as a function $f$: $R^2 \rightarrow R^2$ of offsets, which is over all possible patch matches in the enlarged local region, for some distance function D between two patches. The algorithm comprises three main operations: 1) fill the NNF with either random offsets or some prior information; 2) apply an iterative update process to the NNF, in which good patch offsets are propagated to adjacent pixels; and 3) perform a random search in the neighborhood of the best offset found so far. Independently of these three operations, the PatchMatch algorithm may also use a coarse-to-fine approach by building an image pyramid to obtain a better result.

At operation 540, the inpainting component 404 inpaints (e.g., fills) the masked region (e.g., the scaled user-selected region) in the original image using a portion of the identified patch matches. The inpainting of the masked region in the original image results in a modified image where the user-selected region has been filled with other portions of the image to produce an image that appears natural despite omitting what was previously shown in the user-selected region.

At operation 545, the smoothing component 406 blends the inpainted region into the modified image. For example, the smoothing component 406 may apply Laplacian blending to blend the inpainted region into the modified image. The blending of the inpainted region results in a modified image that appears even more natural than the initial inpainted result produced as a result of operation 540.

Figure 6:
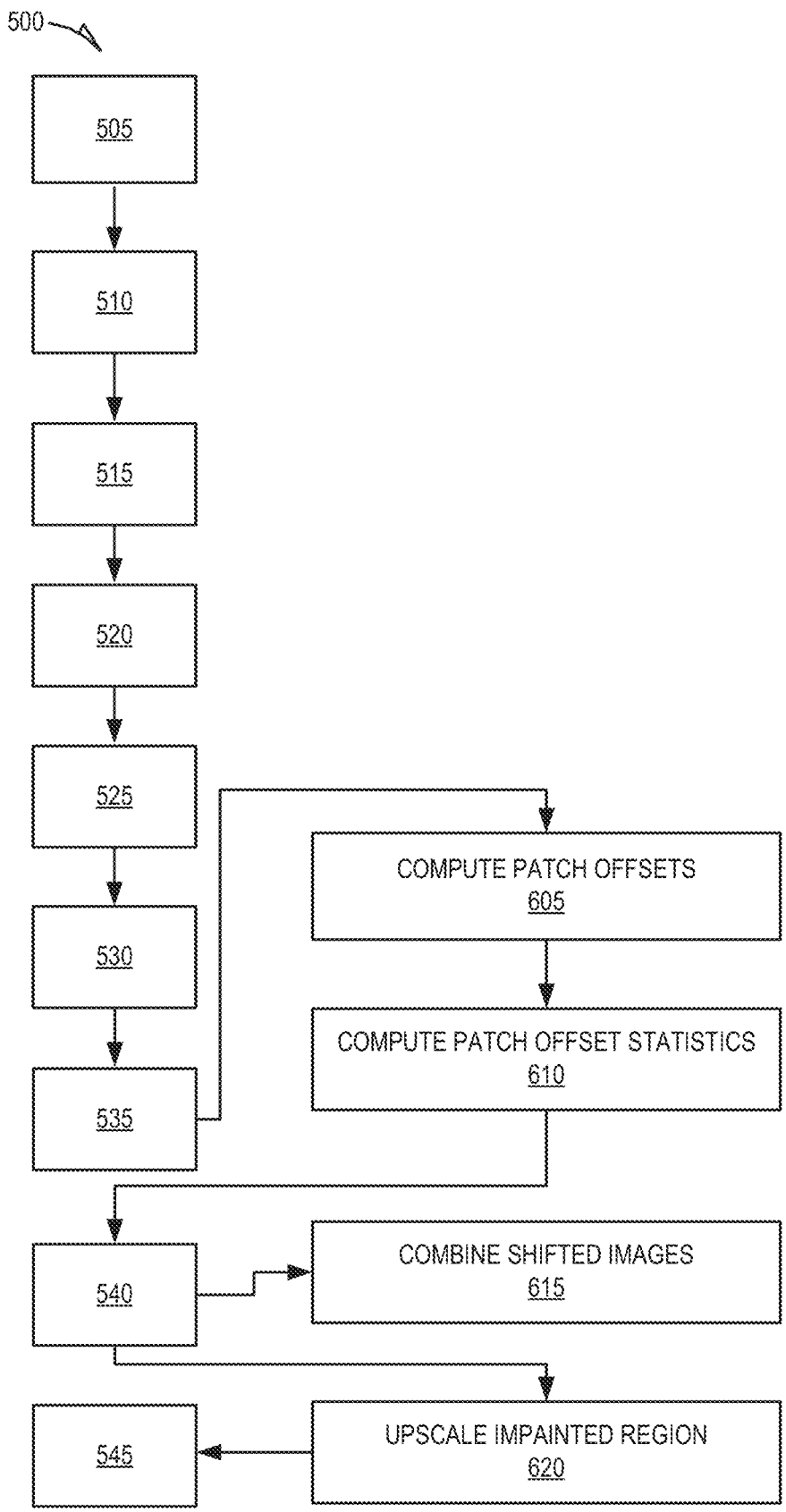

As shown in FIG. 6, the method 500 may, in some embodiments, also include operations 605, 610, 615, and 620. The operations 605 and 610 may be performed subsequent to operation 535, in which the inpainting component 404 identifies patch matches within the enlarged local region, or as part of the operation 540, in which the inpainting component 404 inpaints the user-selected region in the original image using a portion of the patch match offsets. At operation 605, the inpainting component 404 computes patch offsets for the patch matches identified, at operation 535, within the enlarged local region. A patch offset includes two-dimensional coordinates representing a distance between two patch matches. As an example, for each patch, P, in the enlarged local region, the inpainting component 404 computes its offset s to its most similar patch according to the following function:

$$s(x)=\arg\min\|P(x+s)-P(x)\|^2 \; s.t. \; |s|>\tau.$$

Here, s=(u, v) is the two-dimensional coordinates of the offset, x=(x, y) is the position of a patch, and P(x) is the patch centered between two patches. The threshold $\tau$ is to preclude nearby patches.

At operation 610, the inpainting component 404 determines patch offset statistics based on the patch offsets. For example, given all the offsets s(x), the inpainting component 404 computes their statistics by a two-dimensional histogram h(u,v):

$$h(u,v)=\Sigma_x\delta(s(x)=(u,v)).$$

Here, $\delta(\cdot)$ is 1 when the argument is true and 0 otherwise.

Operation 615 may be performed as part of the operation 540, in which the inpainting component 404 inpaints the user-selected region using a portion of the identified patch matches. At operation 615, the inpainting component 404 combines shifted images based on the offset statistics to fill the scaled user-selected region to produce the modified image. The combining of the shifted images may include applying the pixel-level graph cut algorithm, where the inpainting component 404 applies a label to each pixel in the enlarged local region that corresponds to a possible offset in the histogram while also enforcing pairwise consistency constraints between two neighboring pixels.

For example, the inpainting component 404 may identify the K dominant offsets in the two-dimensional histogram, which are the K highest peaks in the histogram. Given the K offsets, the inpainting component 404 optimizes the following Markov random field (MRF) energy function:

$$E(L) = \sum_{x\in\Omega} E_d(L(x)) + \sum_{(x,x')|x\in\Omega,x'\in\Omega} E_{s(L(x),L(x'))}.$$

Here, $\Omega$ is the user-selected region, and (x, x') are 4-connected neighbors. L is a label representing the pre-selected offsets $\{s_i\}^K_{i=1}$ or $s_0=(0,0)^1$. "L(x)=i" means that the inpainting component 404 copies the pixel at $x+s_i$ to the location x. The term $E_d$ is 0 if the label is valid ($x+s_i$ is a known pixel), and if not it is $+\infty$. The smoothness term $E_s$ penalizes incoherent seams. When a=L(x) and b=L(x'), $E_s$ is defined as:

$$E_s(a,b)=\|I(x+s_a)-I(x+s_b)\|^2+\|I(x'+s_a)-I(x'+s_b)\|^2.$$

Here, I(x) is the RGB color of x. I(x+s) is a shifted image given fixed s. If $s_a \neq s_b$, there is a seam between x and x'. Thus, the above equation penalizes such a seam that the two shifted images $I(x+s_a)$ and $I(x+s_b)$ are not similar near this seam.

Operation 620 may be performed subsequent to operation 540, in which the inpainting component 404 inpaints the user selected region in the original image using a portion of the identified patch matches. At operation 620, the inpainting component 404 upscales the inpainted region to the original image resolution. For example, the inpainting component 404 may employ a super resolution step using the graph cut algorithm. To illustrate this example, the following function may be used:

$$E(X)=\Sigma_i \phi(x_i)+\Sigma_{j \text{ in } N(xi)} \Psi(x_i,x_j)$$

Here, x is a set of known pixels and $N(x_i)$ is a neighborhood of unknown pixels $x_i$ after applying transform to its closest inpainted pixel. For each unknown pixel $(x_i, y_i)$, the inpainting component finds the closest inpainted pixel $(x_0, y_0)$ and then applies a (x, y) transform to get the new pixel location $(x_0+x, y_0+y)$, then find a 4-pixel neighborhood of the pixel location $(x_0+x-(x_i-x_0), y_0+y-(y_i-y_0))$. The graph cut algorithm then assigns one of these four pixel values to $(x_i, y_i)$, based on color intensity matching score as well as a neighboring pixel consistency constraint. To further optimize the runtime speed on mobile devices, the image processing system 208 may constrain the search neighborhood such that each pixel in the low-resolution result can only map back to its top left or bottom right neighbors (rather than all four neighboring pixels).

Figure 7:
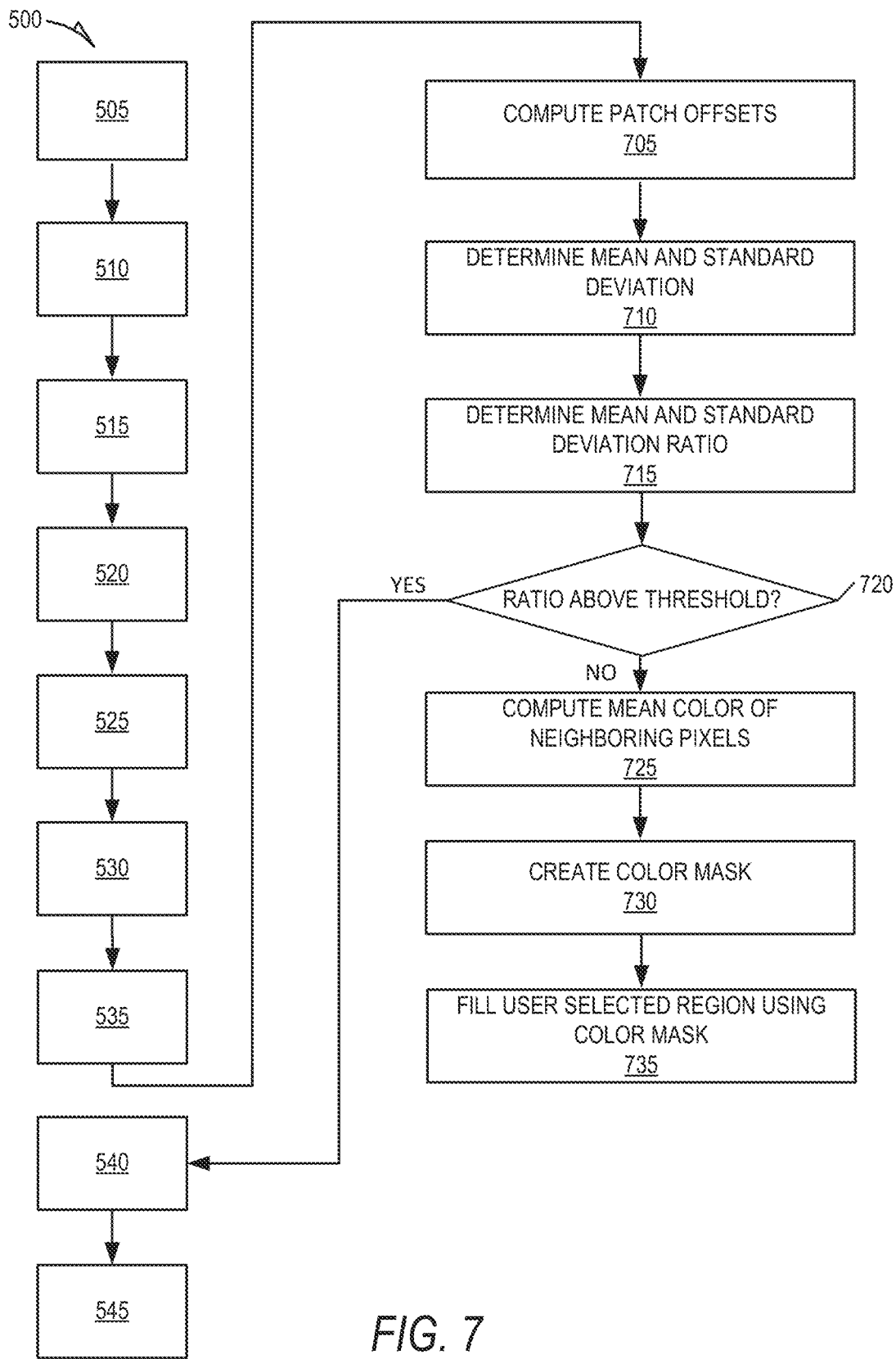

As shown in FIG. 7, the method 500 may also include operations 705, 710, 715, 720, 725, 730, and 735, which may be performed subsequently to the operation 535, in which the inpainting component 404 identifies patch matches within the enlarged local region. At operation 705, the inpainting component 404 computes patch offset statistics in the manner described above with reference to operation 610.

At operation 710, the inpainting component 404 determines a mean and standard deviation of the offsets in the histogram described above in reference to operation 610. At operation 715, the inpainting component 404 determines a ratio between the mean and standard deviation. At operation 720, the inpainting component 404 determines whether the ratio is above a predefined threshold. If, at operation 720, the inpainting component 404 determines that the ratio is above the threshold, the method 500 proceeds to operation 540, where the inpainting component 404 inpaints the user-selected region in the original image using a portion of the identified patch matches.

If, at operation 720, the inpainting component 404 determines that the ratio is not above the threshold, the method 500 proceeds to operation 725, where the inpainting component 404 computes a mean color of neighboring pixels (e.g., pixels near the user-selected region). At operation 730, the inpainting component 404 generates a color mask using the mean color of the neighboring pixels. At operation 735, the inpainting component 404 fills the user-selected region using the color mask.

Figure 8:
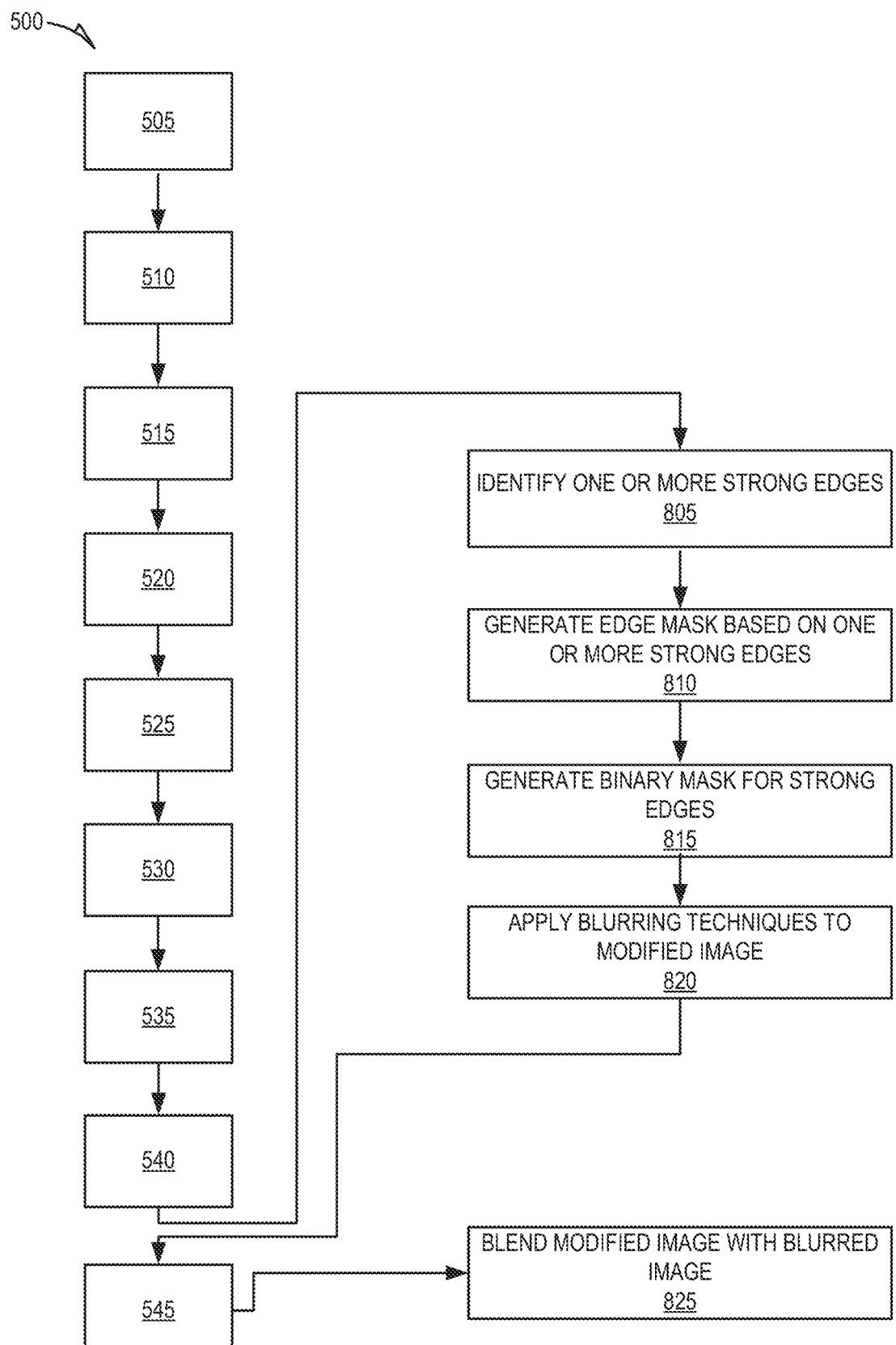

As shown in FIG. 8, the method 500 may, in some embodiments, include operations 805, 810, 815, 820, and 825. Operations 805, 810, 815, and 820 may be performed subsequently to operation 540, in which the inpainting component 404 inpaints the user-selected region using a portion of the identified patch matches, thereby generating the modified image. At operation 805, the smoothing component 406 identifies one or more strong edges in the modified image. The smoothing component 406 may identify the strong edges by applying edge-preserving filtering to the modified image to blur insignificant edges in the modified image. The application of the edge-preserving filtering results in a grayscale image.

At operation 810, the smoothing component 406 generates an edge map for the modified image based on the grayscale image. At operation 815, the smoothing component 406 generates a binary mask for possible strong edges in the modified image. The smoothing component 406 may generate the binary mask by dilating the edge map.

At operation 820, the smoothing component 406 applies blurring techniques to the modified image to produce a blurred version of the modified image (referred to hereinafter as the "blurred image"). For example, the smoothing component 406 may apply Gaussian blurring to the modified image to produce the blurred image.

Operation 825 may be performed in parallel with or as part of operation 545, in which the smoothing component 406 blends the inpainted region into the modified image. At operation 825, the smoothing component 406 blends the modified image with the blurred image using the binary mask to produce an further modified image with no strong edges. In blending the modified image with the blurred image, the smoothing component 406 may apply Laplacian blending.

Figure 9A:
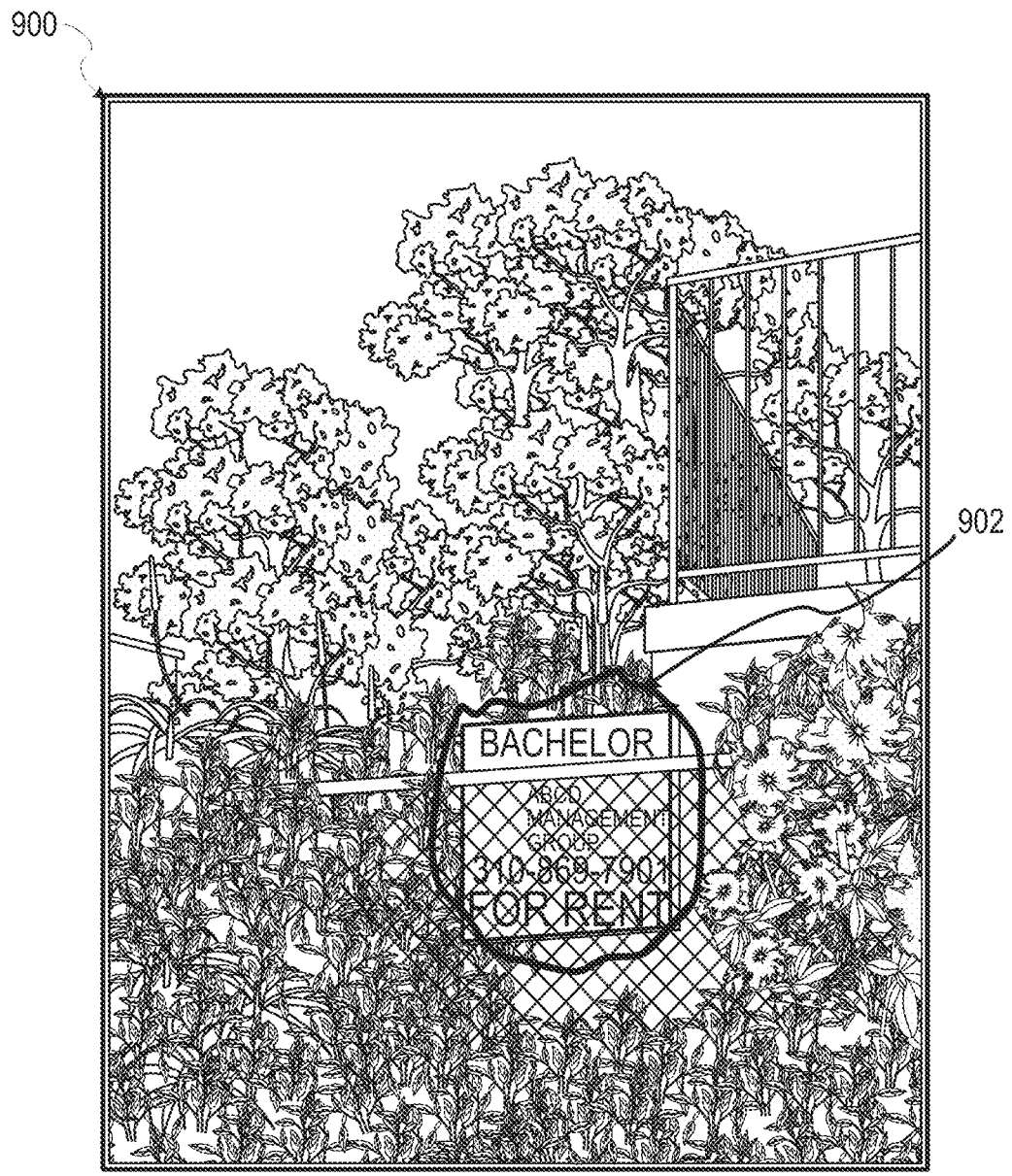
FIGS. 9A and 9B are interface diagrams illustrating aspects of user interfaces provided by the messaging system, according to some embodiments.
Figure 9B:
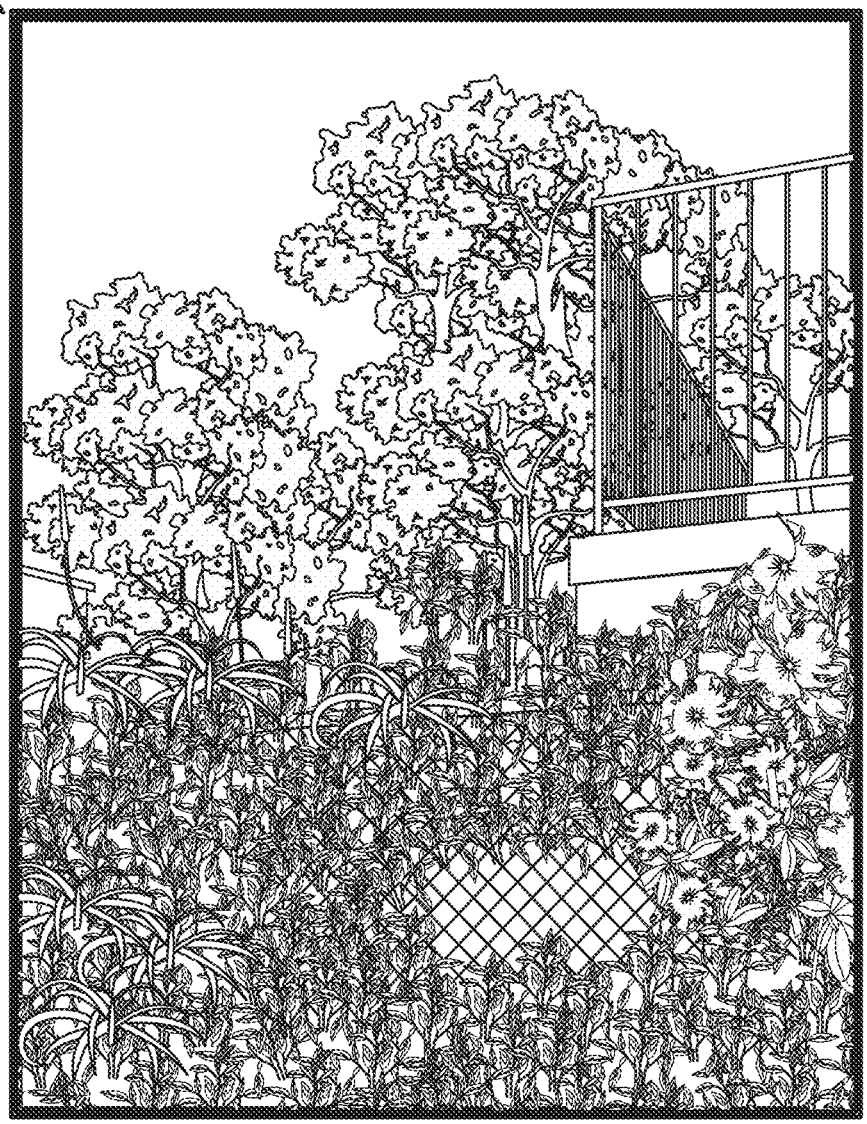

FIGS. 9A and 9B are interface diagrams illustrating aspects of user interfaces provided by the messaging system, according to some embodiments. In particular, FIG. 9A illustrates an original image 900 that may be captured by and presented within a user interface display on the client device 102. The original image 900 includes a user-selected region 902. As an example, a user of the client device 102 may select the region 902 by using his or her finger to trace an outline of the region 902 on a touch screen of the client device 102, although any other appropriate input device (e.g., a mouse) may be used to trace an outline of the region 902. An object, specifically a sign, is shown within the user-selected region 902.

FIG. 9B illustrates a modified image 950 that may be presented within a user interface display on the client device 102. The modified image 950 is an edited version of the original image 900 generated by applying the techniques described herein to the user-selected region 902. More specifically, in the modified image 950 the user-selected region 902 has been removed and replaced with other portions of the original image 900 to create a natural-looking image without the object shown within the user-selected region 902 of the original image 900.

Software Architecture

Figure 10:
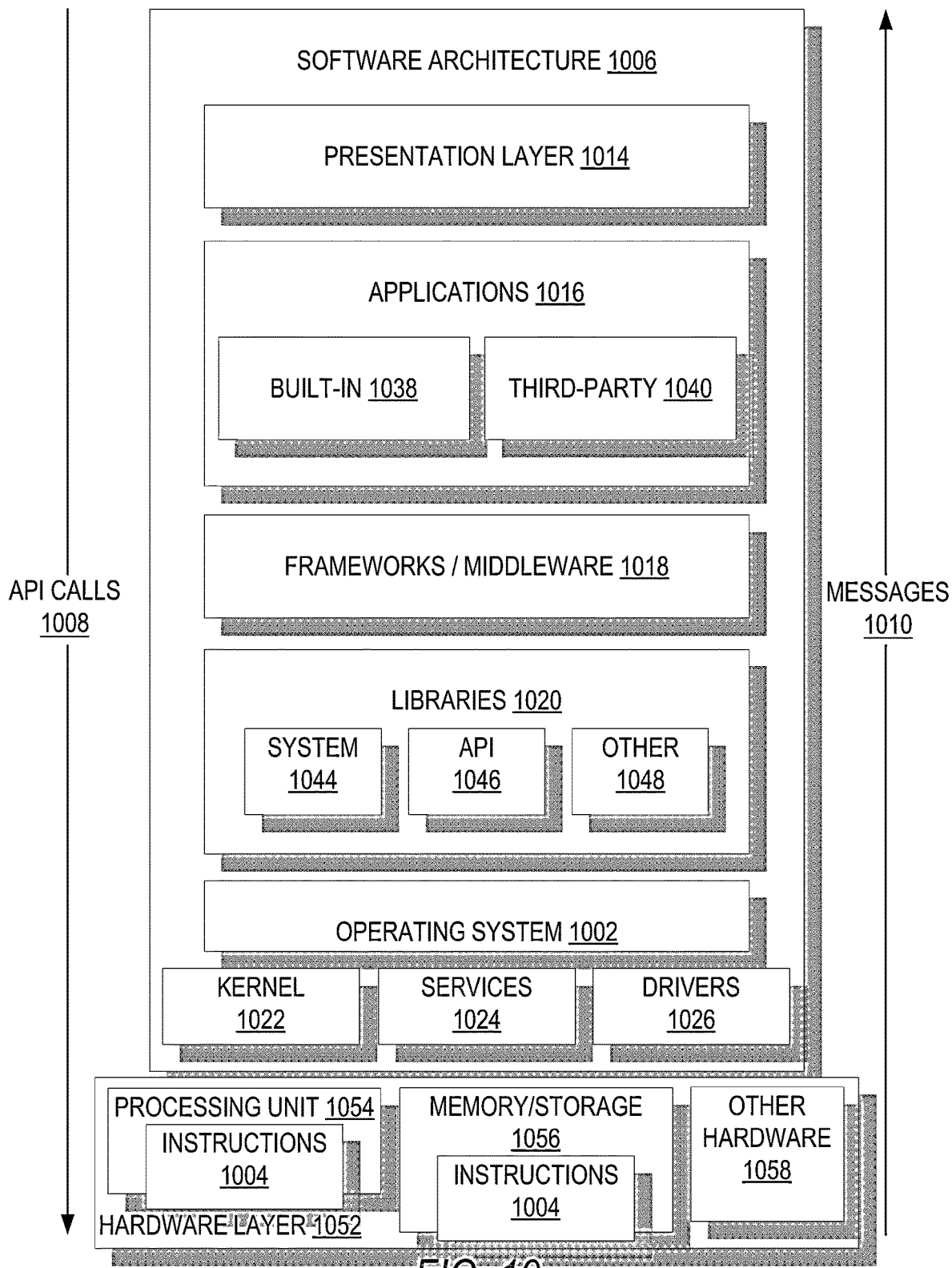
FIG. 10 is a block diagram illustrating a representative software architecture, which may be used in conjunction with various hardware architectures herein described.

FIG. 10 is a block diagram illustrating an example software architecture 1006, which may be used in conjunction with various hardware architectures herein described. FIG. 10 is a non-limiting example of a software architecture and it will be appreciated that many other architectures may be implemented to facilitate the functionality described herein. The software architecture 1006 may execute on hardware such as a machine 1100 of FIG. 11 that includes, among other things, processors 1104, memory/storage 1106, and I/O components 1118. A representative hardware layer 1052 is illustrated and can represent, for example, the machine 1100 of FIG. 11. The representative hardware layer 1052 includes a processing unit 1054 having associated executable instructions 1004. The executable instructions 1004 represent the executable instructions of the software architecture 1006, including implementation of the methods, components, and so forth described herein. The hardware layer 1052 also includes memory and/or storage modules memory/storage 1056, which also have the executable instructions 1004. The hardware layer 1052 may also comprise other hardware 1058.

As used herein, the term "component" may refer to a device, a physical entity, or logic having boundaries defined by function or subroutine calls, branch points, APIs, and/or other technologies that provide for the partitioning or modularization of particular processing or control functions.

Components may be combined via their interfaces with other components to carry out a machine process. A component may be a packaged functional hardware unit designed for use with other components and a part of a program that usually performs a particular function of related functions.

Components may constitute either software components (e.g., code embodied on a machine-readable medium) or hardware components. A "hardware component" is a tangible unit capable of performing certain operations and may be configured or arranged in a certain physical manner. In various exemplary embodiments, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations.

A hardware component may be a special-purpose processor, such as a Field-Programmable Gate Array (FPGA) or an Application-Specific Integrated Circuit (ASIC). A hardware component may also include programmable logic or circuitry that is temporarily configured by software to perform certain operations. For example, a hardware component may include software executed by a general-purpose processor or other programmable processor. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software) may be driven by cost and time considerations.

A processor may be, or include, any circuit or virtual circuit (a physical circuit emulated by logic executing on an actual processor) that manipulates data values according to control signals (e.g., "commands," "op codes," "machine code," etc.) and that produces corresponding output signals that are applied to operate a machine. A processor may, for example, be a Central Processing Unit (CPU), a Reduced Instruction Set Computing (RISC) processor, a Complex Instruction Set Computing (CISC) processor, a Graphics Processing Unit (GPU), a Digital Signal Processor (DSP), an ASIC, a Radio-Frequency Integrated Circuit (RFIC), or any combination thereof. A processor may further be a multi-core processor having two or more independent processors (sometimes referred to as "cores") that may execute instructions contemporaneously.

Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In embodiments in which multiple hardware components are configured or instantiated at different times, communications between or among such hardware components may be achieved, for example, through the storage and retrieval of information in memory structures to which the multiple hardware components have access.

For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information). The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors or processor-implemented components.

Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API). The performance of certain of the operations may be distributed among the processors, not only residing within a single machine, but deployed across a number of machines. In some exemplary embodiments, the processors or processor-implemented components may be located in a single geographic location (e.g., within a home environment, an office environment, or a server farm). In other exemplary embodiments, the processors or processor-implemented components may be distributed across a number of geographic locations.

In the exemplary architecture of FIG. 10, the software architecture 1006 may be conceptualized as a stack of layers where each layer provides particular functionality. For example, the software architecture 1006 may include layers such as an operating system 1002, libraries 1020, frameworks/middleware 1018, applications 1016, and a presentation layer 1014. Operationally, the applications 1016 and/or other components within the layers may invoke API calls 1008 through the software stack and receive a response as messages 1010. The layers illustrated are representative in nature and not all software architectures have all layers. For example, some mobile or special-purpose operating systems may not provide a frameworks/middleware 1018, while others may provide such a layer. Other software architectures may include additional or different layers.

The operating system 1002 may manage hardware resources and provide common services. The operating system 1002 may include, for example, a kernel 1022, services 1024, and drivers 1026. The kernel 1022 may act as an abstraction layer between the hardware and the other software layers. For example, the kernel 1022 may be responsible for memory management, processor management (e.g., scheduling), component management, networking, security settings, and so on. The services 1024 may provide other common services for the other software layers. The drivers 1026 are responsible for controlling or interfacing with the underlying hardware. For instance, the drivers 1026 include display drivers, camera drivers, Bluetooth® drivers, flash memory drivers, serial communication drivers (e.g., Universal Serial Bus (USB) drivers), Wi-Fi® drivers, audio drivers, power management drivers, and so forth depending on the hardware configuration.

The libraries 1020 provide a common infrastructure that is used by the applications 1016 and/or other components and/or layers. The libraries 1020 provide functionality that allows other software components to perform tasks in an easier fashion than by interfacing directly with the underlying operating system 1002 functionality (e.g., kernel 1022, services 1024, and/or drivers 1026). The libraries 1020 may include system libraries 1044 (e.g., C standard library) that may provide functions such as memory allocation functions, string manipulation functions, mathematical functions, and the like. In addition, the libraries 1020 may include API libraries 1046 such as media libraries (e.g., libraries to support presentation and manipulation of various media formats such as MPEG4, H.264, MP3, AAC, AMR, JPG, and PNG), graphics libraries (e.g., an OpenGL framework that may be used to render 2D and 3D graphic content on a display), database libraries (e.g., SQLite that may provide various relational database functions), web libraries (e.g., WebKit that may provide web browsing functionality), and the like. The libraries 1020 may also include a wide variety of other libraries 1048 to provide many other APIs to the applications 1016 and other software components/modules.

The frameworks/middleware 1018 provide a higher-level common infrastructure that may be used by the applications 1016 and/or other software components/modules. For example, the frameworks/middleware 1018 may provide various graphic user interface (GUI) functions, high-level resource management, high-level location services, and so forth. The frameworks/middleware 1018 may provide a broad spectrum of other APIs that may be utilized by the applications 1016 and/or other software components/modules, some of which may be specific to a particular operating system 1002 or platform.

The applications 1016 include built-in applications 1038 and/or third-party applications 1040. Examples of representative built-in applications 1038 may include, but are not limited to, a contacts application, a browser application, a book reader application, a location application, a media application, a messaging application, and/or a game application. The third-party applications 1040 may include an application developed using the ANDROID™ or IOS™ software development kit (SDK) by an entity other than the vendor of the particular platform, and may be mobile software running on a mobile operating system such as IOS™, ANDROID™, WINDOWS® Phone, or other mobile operating systems. The third-party applications 1040 may invoke the API calls 1008 provided by the mobile operating system (such as the operating system 1002) to facilitate functionality described herein.

The applications 1016 may use built-in operating system functions (e.g., kernel 1022, services 1024, and/or drivers 1026), libraries 1020, and frameworks/middleware 1018 to create user interfaces to interact with users of the system. Alternatively, or additionally, in some systems interactions with a user may occur through a presentation layer, such as the presentation layer 1014. In these systems, the application/component "logic" can be separated from the aspects of the application/component that interact with a user.

Exemplary Machine

Figure 11:
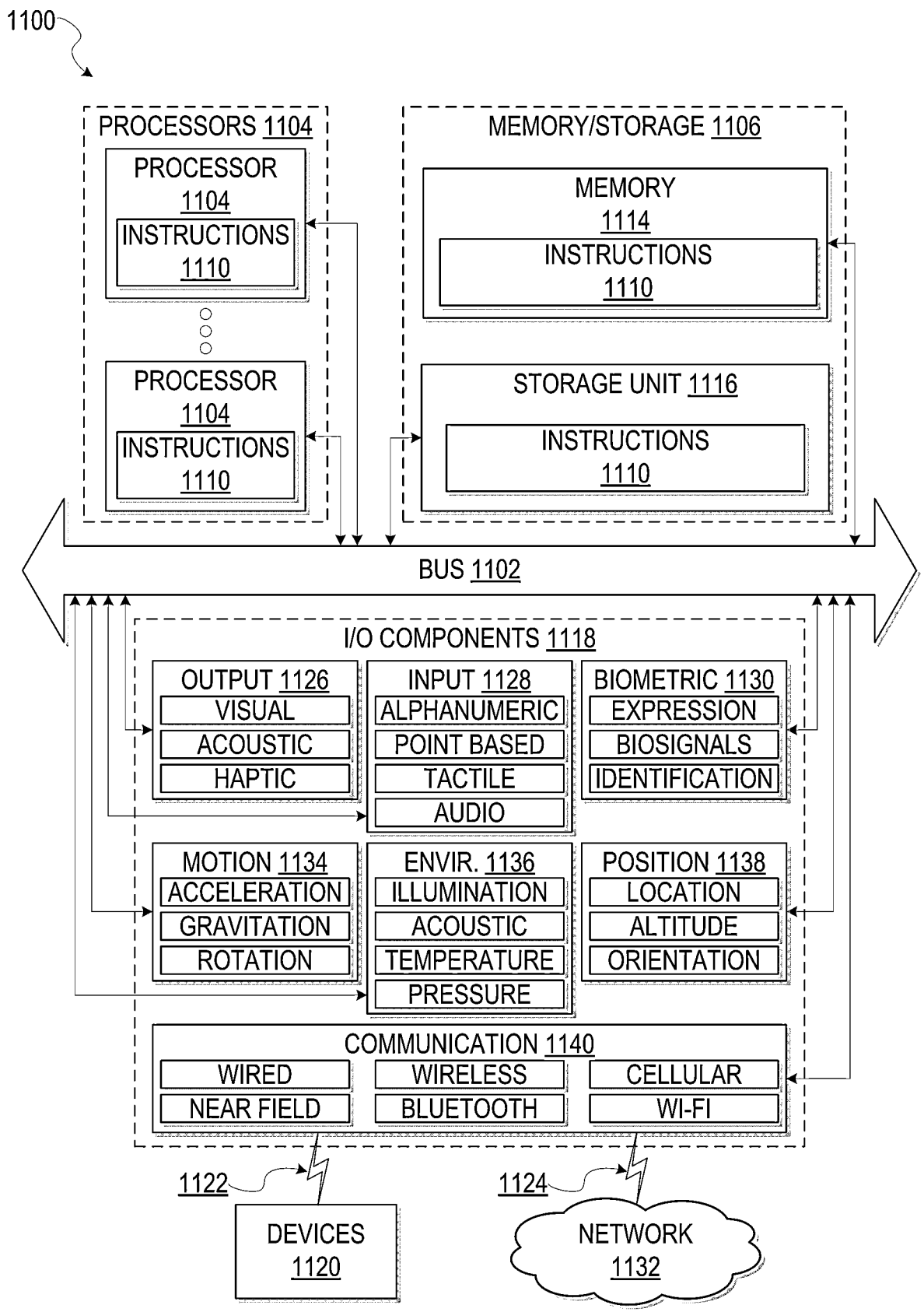
FIG. 11 is a block diagram illustrating components of a machine, according to some exemplary embodiments, able to read instructions from a machine-readable medium (e.g., a machine-readable storage medium) and perform any one or more of the methodologies discussed herein.

FIG. 11 is a block diagram illustrating components (also referred to herein as "modules") of a machine 1100, according to some exemplary embodiments, able to read instructions from a machine-readable medium (e.g., a machine-readable storage medium) and perform any one or more of the methodologies discussed herein. Specifically, FIG. 11 shows a diagrammatic representation of the machine 1100 in the example form of a computer system, within which instructions 1110 (e.g., software, a program, an application, an applet, an app, or other executable code) for causing the machine 1100 to perform any one or more of the methodologies discussed herein may be executed. As such, the instructions 1110 may be used to implement modules or components described herein. The instructions 1110 transform the general, non-programmed machine 1100 into a particular machine 1100 programmed to carry out the described and illustrated functions in the manner described. In alternative embodiments, the machine 1100 operates as a standalone device or may be coupled (e.g., networked) to other machines. In a networked deployment, the machine 1100 may operate in the capacity of a server machine or a client machine in a server-client network environment, or as a peer machine in a peer-to-peer (or distributed) network environment. The machine 1100 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 1110, sequentially or otherwise, that specify actions to be taken by machine 1100. Further, while only a single machine 1100 is illustrated, the term "machine" shall also be taken to include a collection of machines that individually or jointly execute the instructions 1110 to perform any one or more of the methodologies discussed herein.

The machine 1100 may include processors 1104, memory/storage 1106, and I/O components 1118, which may be configured to communicate with each other such as via a bus 1102. The memory/storage 1106 may include a memory 1114, such as a main memory, or other memory storage, and a storage unit 1116, both accessible to the processors 1104 such as via the bus 1102. The storage unit 1116 and memory 1114 store the instructions 1110 embodying any one or more of the methodologies or functions described herein. The instructions 1110 may also reside, completely or partially, within the memory 1114, within the storage unit 1116, within at least one of the processors 1104 (e.g., within the processor's cache memory), or any suitable combination thereof, during execution thereof by the machine 1100. Accordingly, the memory 1114, the storage unit 1116, and the memory of the processors 1104 are examples of machine-readable media.

As used herein, the term "machine-readable medium," "computer-readable medium," or the like may refer to any component, device, or other tangible medium able to store instructions and data temporarily or permanently. Examples of such media may include, but are not limited to, random-access memory (RAM), read-only memory (ROM), buffer memory, flash memory, optical media, magnetic media, cache memory, other types of storage (e.g., Electrically Erasable Programmable Read-Only Memory (EEPROM)), and/or any suitable combination thereof. The term "machine-readable medium" should be taken to include a single medium or multiple media (e.g., a centralized or distributed database, or associated caches and servers) able to store instructions. The term "machine-readable medium" may also be taken to include any medium, or combination of multiple media, that is capable of storing instructions (e.g., code) for execution by a machine, such that the instructions, when executed by one or more processors of the machine, cause the machine to perform any one or more of the methodologies described herein. Accordingly, a "machine-readable medium" may refer to a single storage apparatus or device, as well as "cloud-based" storage systems or storage networks that include multiple storage apparatus or devices. The term "machine-readable medium" excludes signals per se.

The I/O components 1118 may include a wide variety of components to provide a user interface for receiving input, providing output, producing output, transmitting information, exchanging information, capturing measurements, and so on. The specific I/O components 1118 that are included in the user interface of a particular machine 1100 will depend on the type of machine. For example, portable machines such as mobile phones will likely include a touch input device or other such input mechanisms, while a headless server machine will likely not include such a touch input device. It will be appreciated that the I/O components 1118 may include many other components that are not shown in FIG. 11. The I/O components 1118 are grouped according to functionality merely for simplifying the following discussion and the grouping is in no way limiting. In various exemplary embodiments, the I/O components 1118 may include output components 1126 and input components 1128. The output components 1126 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 1128 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or other pointing instruments), tactile input components (e.g., a physical button, a touch screen that provides location and/or force of touches or touch gestures, or other tactile input components), audio input components (e.g., a microphone), and the like. The input components 1128 may also include one or more image-capturing devices, such as a digital camera for generating digital images and/or video.

In further exemplary embodiments, the I/O components 1118 may include biometric components 1130, motion components 1134, environment components 1136, or position components 1138, as well as a wide array of other components. For example, the biometric components 1130 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 1134 may include acceleration sensor components (e.g., accelerometer), gravitation sensor components, rotation sensor components (e.g., gyroscope), and so forth. The environment components 1136 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detect concentrations of hazardous gases for safety or to measure pollutants in the atmosphere), or other components that may provide indications, measurements, or signals corresponding to a surrounding physical environment. The position components 1138 may include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1118 may include communication components 1140 operable to couple the machine 1100 to a network 1132 or devices 1120 via a coupling 1124 and a coupling 1122 respectively. For example, the communication components 1140 may include a network interface component or other suitable device to interface with the network 1132. In further examples, the communication components 1140 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 1120 may be another machine or any of a wide variety of peripheral devices (e.g., a peripheral device coupled via a USB).

Moreover, the communication components 1140 may detect identifiers or include components operable to detect identifiers. For example, the communication components 1140 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF4111, Ultra Code, UCC RSS-2D bar code, and other optical codes), or acoustic detection components (e.g., microphones to identify tagged audio signals). In addition, a variety of information may be derived via the communication components 1140, such as location via Internet Protocol (IP) geo-location, location via Wi-Fi® signal triangulation, location via detecting an NFC beacon signal that may indicate a particular location, and so forth.

Where a phrase similar to "at least one of A, B, or C," "at least one of A, B, and C," "one or more of A, B, or C," or "one or more of A, B, and C" is used, it is intended that the phrase be interpreted to mean that A alone may be present in an embodiment, B alone may be present in an embodiment, C alone may be present in an embodiment, or any combination of the elements A, B, and C may be present in a single embodiment; for example, A and B, A and C, B and C, or A and B and C may be present.

Changes and modifications may be made to the disclosed embodiments without departing from the scope of the present disclosure. These and other changes or modifications are intended to be included within the scope of the present disclosure, as expressed in the following claims.

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice applies to the software and data as described below and in the drawings that form a part of this document: Copyright 2017, SNAPCHAT, INC., All Rights Reserved.

What is claimed is:

1. A method comprising:
selecting a region of an image;
generating a mask based on a local region in the image;
replacing the selected region with the mask, the replacing of the selected region yielding a modified image;
generating an edge map based on one or more strong edges identified in the modified image;
generating a binary mask by dilating the edge map;
applying blur techniques to the modified image to yield a blurred image; and
generating a blended image by applying blending with the binary mask to the modified image and the blurred image.

2. The method of claim 1, wherein the selected region includes a depicted object.

3. The method of claim 2, further comprising causing presentation of the modified image without the depicted object on a display device.

4. The method of claim 1, wherein the one or more strong edges are identified by applying edge-preserving filtering to the modified image to blur insignificant edges in the modified image.

5. The method of claim 1, wherein the blur techniques include Gaussian blur.

6. The method of claim 1, wherein the blending is Laplacian blending.

7. The method of claim 1, further comprising determining the local region based on a size of the selected region.

8. The method of claim 1, wherein determining the local region includes dynamically computing dimensions of the local region based on dimensions of the selected region, the method further comprising:
responsive to detecting that the selected region is within a predetermined distance of a border of the image:
padding a height and width of the image based on a predetermined padding size;
enlarging the local region by the predetermined padding size; and
scaling the selected region to a predetermined size.

9. The method of claim 1, wherein the local region surrounds the selected region.

10. The method of claim 1, wherein the selected region is identified based on an input from a user.

11. A system comprising:
a processor; and
memory coupled to the processor and storing instructions that, when executed by the processor, cause the system to perform operations comprising:
selecting a region of an image;
generating a mask based on a local region in the image;
replacing the selected region with the mask, the replacing of the selected region yielding a modified image;
generating an edge map based on one or more strong edges identified in the modified image;
generating a binary mask dilating the edge map;
applying blur techniques to the modified image to yield a blurred image; and
blending the modified image and the blurred image using the binary mask.

12. The system of claim 11, wherein the selected region includes a depicted object.

13. The system of claim 12, wherein the operations further comprise causing presentation of the modified image without the depicted object on a display device.

14. The system of claim 11 wherein the one or more strong edges are identified by applying edge-preserving filtering to the modified image to blur insignificant edges in the modified image.

15. The system of claim 11, wherein the blur techniques include Gaussian blur.

16. The system of claim 11, wherein the blending of the modified image with the blurred image includes applying Laplacian blending to the modified image and the blurred image with the binary mask.

17. The system of claim 11, wherein the operations comprise determining the local region based on a size of the selected region.

18. The system of claim 11, wherein determining the local region includes dynamically computing dimensions of the local region based on dimensions of the selected region.

19. The system of claim 11, wherein the local region surrounds the selected region.

20. A machine-readable non-transitory storage medium having instruction data executable by a machine to cause the machine to perform operations comprising:
selecting a region of an image;
generating a mask based on a local region in the image;
replacing the selected region with the mask, the replacing of the selected region yielding a modified image;
generating an edge map based on one or more strong edges identified in the modified image;
generating a binary mask by dilating the edge map;
applying blur techniques to the modified image to yield a blurred image; and
generating a blended image by applying blending with the binary mask to the modified image and the blurred image.

* * * * *